United States Patent [19]

Steensma

[11] 4,237,550
[45] Dec. 2, 1980

[54] MULTIUSER PROTECTED OPTICAL DATA BUS DISTRIBUTION SYSTEMS

[75] Inventor: Peter D. Steensma, Midland Park, N.J.

[73] Assignee: International Telephone and Telegraph Corporation, New York, N.Y.

[21] Appl. No.: 46,979

[22] Filed: Jun. 8, 1979

[51] Int. Cl.³ .................. G02B 5/14; G02B 5/16; G08B 13/18
[52] U.S. Cl. .................. 370/4; 455/606; 350/96.13; 350/96.23; 350/96.33; 340/555
[58] Field of Search ........... 455/601, 606, 607, 610, 455/612, 602; 370/4, 86; 350/96.13, 96.23, 96.33; 250/551; 340/555

[56] References Cited

U.S. PATENT DOCUMENTS

| 3,919,483 | 11/1975 | Gindi et al. | 370/86 |
| 3,919,484 | 11/1975 | Maxemchuk | 370/86 |
| 3,943,283 | 3/1976 | Caragliano | 370/86 |
| 4,086,484 | 4/1978 | Steensma | 455/608 |
| 4,089,584 | 5/1978 | Polczynski | 370/4 |

Primary Examiner—Robert L. Griffin
Assistant Examiner—Edward L. Coles
Attorney, Agent, or Firm—John T. O'Halloran; Alfred C. Hill

[57] ABSTRACT

An optical fiber having a center core and an outer core coaxial of the center core is coupled in a loop to a control station and a plurality of equally spaced users. The fiber propagates data time sequentially between the plurality of users on the center core in a given direction around the loop. A source of masking signal disposed in the control station is propagated on the outer core in a direction around the loop opposite to the given direction to prevent intercepting data on the fiber. The masking signal is turned off at a given time for a predetermined length of time to provide a window in the masking signal which arrives at each of the plurality of users in time sequence coincident with the data intended for each of the plurality of users to enable each of the plurality of users to recover the data intended therefore.

16 Claims, 9 Drawing Figures

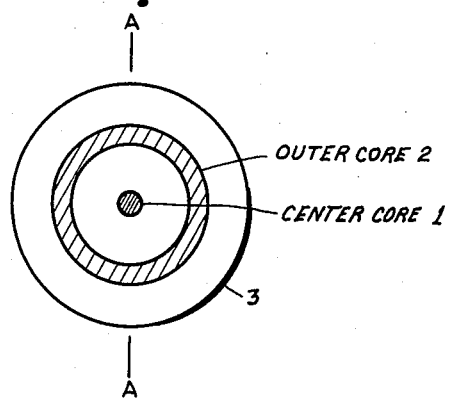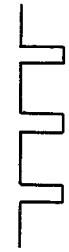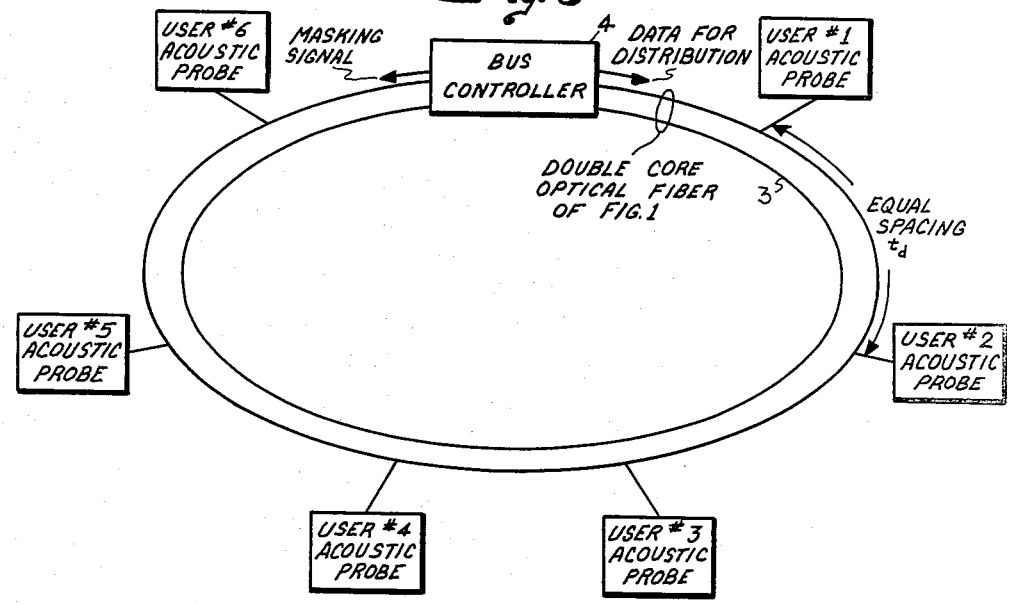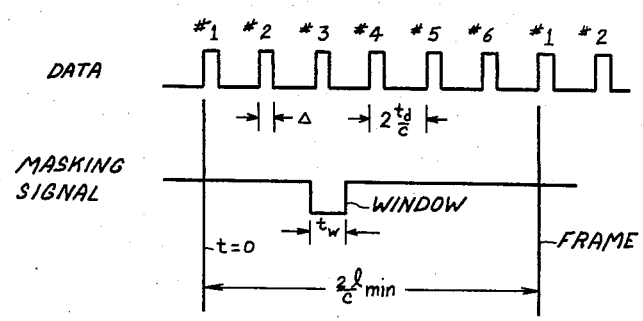

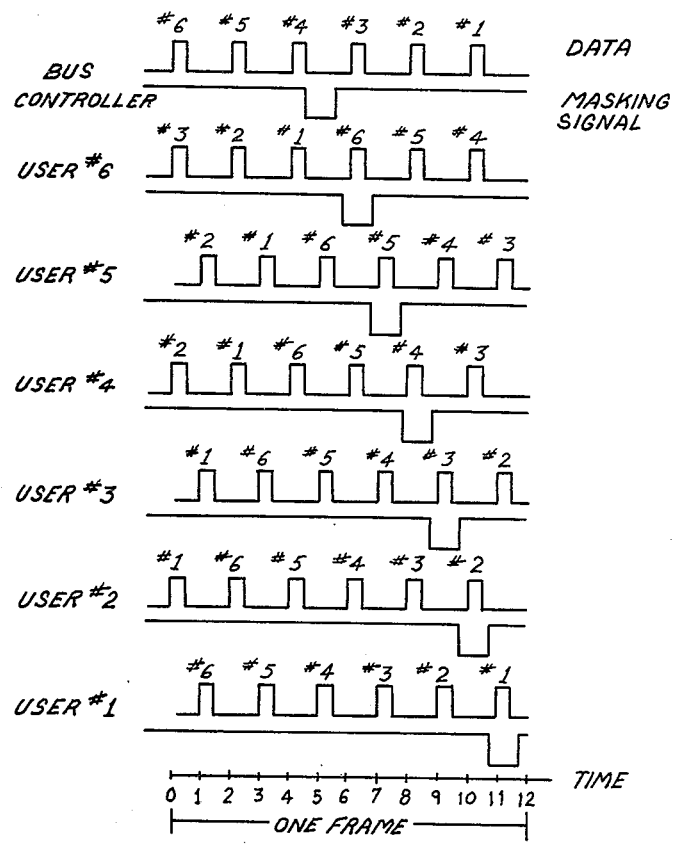
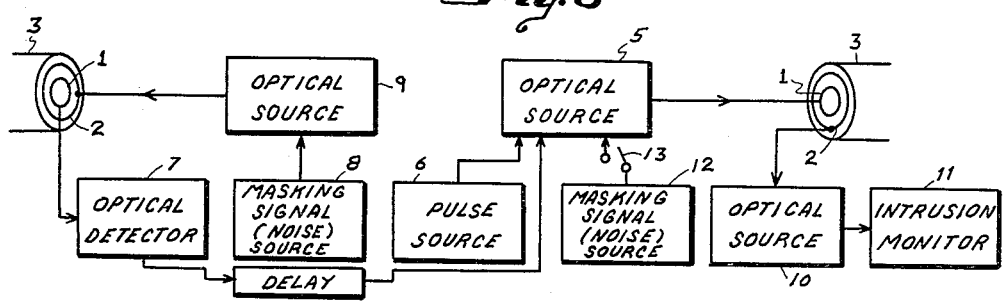
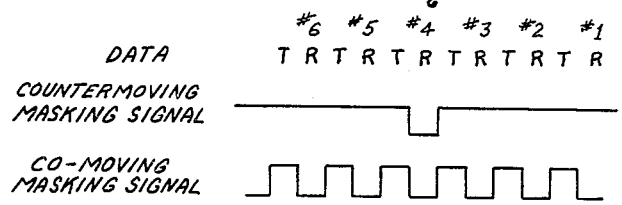

MULTIUSER PROTECTED OPTICAL DATA BUS DISTRIBUTION SYSTEMS

BACKGROUND OF THE INVENTION

The present invention relates to data bus distribution systems and more particularly to multiuser protected optical data bus distribution systems.

Bus or loop distribution techniques are particularly attractive because they allow a number of users to communicate flexibly without the usual intervention of a switching element or a store and forward element. Routing decisions are made by each user or at least dictated by each user so that information flows through the system to all users without being discriminated by a switching mode. However, in many applications the information flowing on the system may be of a sensitive nature and the fact that it is available to any and all users of the system can be rather disconserting. In these cases encryption and decryption is frequently employed to protect such information, but encryption and decryption can be an expensive process and leads to certain difficulties. Among these difficulties is providing conferencing interconnections, since all users must synchronize to the same encryption code simultaneously.

An alternative to encryption and decryption is a protected wireline system system where precautions are taken to prevent both physical access to the transmission path and electrical emanations from that path. Unfortunately, such transmission paths are usually expensive and employed only in point-to-point applications.

In point-to-point applications there are known three intrusion resistance systems which utilize optical fiber techniques that can be utilized for information protection. One such protection system employs an alarm technique that monitors the relative energy contained in mode groups emerging at high and low angles. Changes in the balance of the mode groups are construed as intrusion attempts and produces an alarm. A second protection system is an improvement of the first system where a subcarrier is injected at a 180° phase difference in the two mode groups. A balance in the mode groups at the far end of the system results in the two outputs having no subcarrier frequency present in its output. Since the subcarrier is at a known frequency, integration techniques can be employed to improve the intrusion detection threshold. A third protection system uses a double core fiber structure developed by the assignee of the present invention. The intrusion resistance feature is obtained by transmitting the information on a central core of the double core fiber structure and transmitting a masking signal on an outer core of the double core fiber structure. The output level of the masking signal is monitored at the far end to betray intrusion attempts while the use of the masking signal forces the intruder to make a major disturbance in the fiber to extract the information in the central core. Such a disturbance has a higher detection probability.

SUMMARY OF THE INVENTION

An object of the present invention is to provide a multiuser protected optical data bus distribution system that is less expensive than the encryption and decryption arrangement and enables conferencing interconnections.

Another object of the present invention is to provide a multiuser protected optical data bus distribution system employing the double core optical fiber referred to hereinabove.

A feature of the present invention is the provision of a multiuser protected optical data bus distribution system comprising: an optical fiber capable of propagating thereon two different signals independent of each other, the fiber being coupled in a loop to a control station and N equally spaced users, where N is equal to an integer greater than one, and propagating data between the N users in time sequence in one direction around the loop; and first means disposed in the control station to transmit a first masking signal on the fiber in a direction around the loop opposite to the given direction to prevent interception of the data, the first masking signal being turned off at a given time for a predetermined period of time to provide a window in the first masking signal which arrives at each of the N users in time sequence coincident with the data intended for each of the N users to enable each of the N users to recover the data intended therefore.

Another feature of the present invention is the provision of an optical fiber having a center core to propagate the data and an outer core coaxial of the center core to propagate the masking signal in the above-mentioned multiuser protected optical data bus distribution system.

The protected data bus distribution system employed in the system of the present invention is an extension of the above-mentioned point-to-point protection system using the double core fiber to a protection system for a data bus distribution system. Such a system could be employed either in primary or secondary networks or both. It could be used both for data or telephone communications. The objective of the system of the present invention is to provide user-to-user information protection as well as external intrusion protection while retaining the advantages of bus distribution systems.

BRIEF DESCRIPTION OF THE DRAWING

Above-mentioned and other features and objects of this invention will become more apparent by reference to the following description taken in conjunction with the accompanying drawing, in which:

FIG. 1 is a cross-sectional view of a double core optical fiber transmission line employed in the protection system in accordance with the principles of the present invention;

FIG. 2 is an index of refraction profile taken along line A—A of FIG. 1;

FIG. 3 is a schematic diagram of a multiuser protected optical data bus distribution system in accordance with the principles of the present invention;

FIG. 4 is a timing diagram of the signals from the bus controller of FIG. 3;

FIG. 5 is a timing diagram of the signals for the bus controller and each of the users of FIG. 3;

FIG. 6 is a block diagram of one possible embodiment of the bus controller of FIG. 3;

FIG. 7 is a timing diagram as employed in an improvement of the distribution system as described with respect to FIG. 3 in accordance with the principles of the present invention;

DESCRIPTION OF THE PREFERRED EMBODIMENTS

Figure 8:
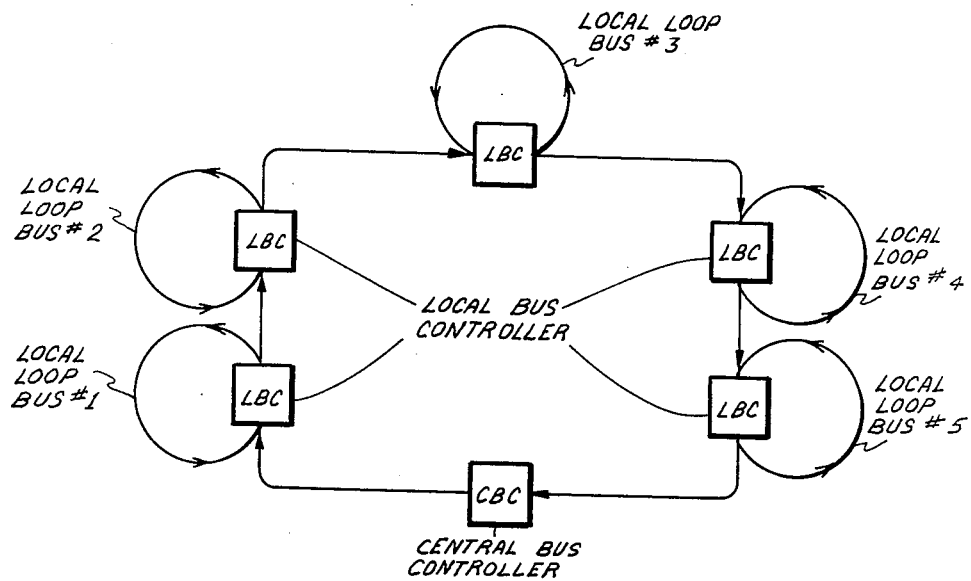
FIG. 8 is a block diagram illustrating a plurality of bus distribution systems of FIG. 3 in a tandem connection network.

Referring to FIG. 1, there is illustrated therein a double core optical fiber transmission line having a center core 1 and an outer core 2 coaxial of core 1. The index of refraction profile along line A—A of the fiber of FIG. 1 is shown in FIG. 2. The magnitudes and dimensions of the index of refraction deviations for each core are determined by the details of a particular requirement. For instance, core 1 may be made with a high numerical aperture so that radiation contained in it is not easily radiated upon bending, while core 2 may be made with a lower numerical aperture so that its bending radiation sensitivity is greater and can be used to detect intrusion attempts. Alternatively, the two numerical apertures can be made equal. In a fiber of the design the separation between cores 1 and 2 is sufficiently great so that interaction between excitation of cores 1 and 2 is negligible when they are independently excited. Pulse dispersion in the individual cores 1 and 2 can be controlled by appropriate index of refraction grading.

In actual operation, this fiber is used with a noise-like modulation propagated along core 2 to conceal information or data which is propagated on core 1. Any outside intruder will intercept high noise levels which will mask the information signal.

Referring to FIG. 3, there is illustrated therein a protected optical data bus distribution system including the double core optical fiber 3 of FIG. 1, a bus controller 4 and a plurality of users #1–#6. In this system data distribution is accomplished by placing data (which may be digital information or pulse amplitude samples), on center core 1 of fiber 3 from each of the users at time intervals that are twice the inter-user transit time $t_d$. A counter moving masking signal is placed on outer core 2 of cable 3 by controller 4 so that time data bits are always traveling under the noise. When the data bit intended for the last user, user N, where N is equal to 6 in the example of FIG. 3, has reached location $(N-1)$ controller 4 then switches off the masking signal for a time interval $t_w$ which is less than the inter-user transit time $t_d$. The window in the masking signal that has thus been created then moves to user N at the same time that the data bit intended for user N is at that location. User N then can read the data bit without interference from the masking signal. Depending on the quantitative levels involved, the data bit can be sampled by a proximity coupler detector or an acoustic probe which produces an acoustic field for scattering the light on center core 1 into a light detector. The use of an acoustic field to detect light on a fiber is discussed in U.S. Pat. No. 4,086,484, whose disclosure is incorporated herein by reference. After a further time interval $t_d$, the window, has moved to location $(N-1)$ at the same time the data bit for user $(N-1)$ has arrived and, thus, user $(N-1)$ can sample his bit. The procedure then continues until all users have received their intended bit.

FIG. 4 illustrates one frame of data including pulses of data for each of the users and the counter moving masking signal and FIG. 5 illustrates a timing diagram of the operation of the system of FIG. 3 as hereinabove described. As can be inferred from the timing diagram of FIG. 5, each user can access only information intended for him at his location. Unauthorized users are thus prevented from intercepting the data not intended therefore.

The bus cycle can be repeated every $2Nt_d$ seconds so that the user sampling rate (frame rate) is $1/(2Nt_d)$ while the total data rate is $1/(2t_d)$. In this system, a clock for the users can be extracted from the bus based on the timing of the window or it may be obtained from a separate clock distribution system.

Using this type of system, a 400 m (meter) bus length with access every 4 m (100 users) would provide a sampling rate of 250 KHz (kilohertz) to each user. The data stream would consist of approximately 5 nsec (nanosecond) pulses with a 25 MHz (megahertz) repetition rate. Lower data rate operation can be provided by distributing K data bits for every window transit, but the sampling must still be done in less than the 5 nsec time period so that this does not appear a particularly attractive option. Higher data rates than the loop transit time limitation can be provided by transmitting M data bits in parallel using M parallel fibers all operating in an identical manner.

A complete system requires a means for users to insert data as well as extract it. One method of making such a provision is to use a bit deletion technique. With this technique a set of bits is interposed between the data bits to be distributed. These are designated Talk bits. A users talk bit is for someone to talk to him. At the bus controller these bits are always present, being generated by a pulse source. Selective deletion inserts information on the bit. After completing one transit of the loop and thus acquiring information, these bits are delayed $t_d/2$ and then rebroadcast, now having become listen bits. Thus the connection is completed.

Referring to FIG. 6, there is illustrated therein one possible embodiment of bus controller 4 of FIG. 3. The arrangement shown in FIG. 6 enables propagation of data on the fiber optic from the users by a bit deletion technique. At controller 4 a binary "1" bit is placed on center core 1 of fiber 3 from optical source 5 modulated by pulse source 6 at every user time slot in the frame. Each of the users is equipped with an acoustic probe as disclosed in the above-cited patent for amplitude modulation of the fiber, although any other device which provides a series switch operation can be employed. In the time slot that has been assigned for talking to a given user, the pulse transmitted from controller 4 is deleted to send a binary "0" or allows the pulse to remain to send a binary "1" to another user. Optical detector 7 coupled to center core 1 receives the data stream from fiber 3 and retransmits it on the bus distribution system by connecting the output of detector 7 to source 5. The masking signal with its window is provided by source 8 and optical source 9 having its output coupled to outer core 2 of fiber 3 in a manner to be counter moving with respect to the data on center core 1 of fiber 3. Optical detector 10 coupled to user core 2 receives the counter moving masking signal and its output is applied to intrusion monitor 11 to provide an indication if physical or outside intrusion is attempted.

A key problem of the system of the present invention that must be overcome is that the masking signal window may cross the data modulated by one user and intended for another user at an uncontrolled access point. This may be circumvented by placing a second masking signal on center core 1 of fiber 3 in addition to the counter moving masking signal outer core 2 of fiber 3. This second masking signal would be a co-moving masking signal with respect to the data stream which is provided by masking signal source 12 coupled to source 5 when switch 13 is closed. This second masking signal would consist of bursts of noise coinciding with the data bits for transmission purposes. The relationship between the data transmitted (T) and the data received (R) for each of the users and the relationship between the first counter moving masking signal and the second co-moving masking signal is illustrated in FIG. 7.

While the protection system of the present invention has been described employing a double core optical fiber, the protection system of the present invention can also employ an optical fiber capable of propagating high and low angle modes.

The interconnection of a plurality of single loop systems as illustrated and described with respect to FIG. 3 to form a multiloop network can be accomplished with either a tandem connection or a fully connected connection. The choice between these configurations is made according to the user data rates. If the user data rate is equal to or less than $1/(2Nt_d)$, a tandem network is chosen, and if $1/(2Nt_d)$ is equal to or less than the user rate which is equal to or less than $1/(2N_L t_d)$, a fully connected network is chosen, wherein N equals the total number of users in the system, $t_d$ is equal to the interuser propagation time and $N_L$ is equal to the number of users in a local distribution loop. FIG. 8 illustrates the tandem connection network and FIG. 9 illustrates the fully connected network.

In the tandem case of FIG. 8, the entire network operates in much the same manner as the single loop arrangement of FIG. 3. All of the data is organized in a superframe on a time division basis. As with the single loop arrangement, received slots are user dedicated, while users may transmit in any slot necessary to establish a link. A link is held stable against undesired third parties by activity markers that are transmitted in parallel with transmit slots. These activity markers are periodically up-dated on a time interval comparable to the mean transmission duration by a central bus controller who poles all users concerning their activity. Once an activity pattern has been determined, it is held and repeated by the central bus controller until it is up-dated again.

Reception of information by a local distribution loop, in the case of a tandem network, is done after the time slots for the loop have completed one complete transit of the network. During this transit all of the information for this loop has been accumulated. When time slots arrive at the loop, two operations take place simultaneously. Information that has been accumulated is distributed and a new frame is initiated by accumulating data for that loop—from that loop which is then passed on through the network to accumulate the next set of data for the loop.

Figure 9:
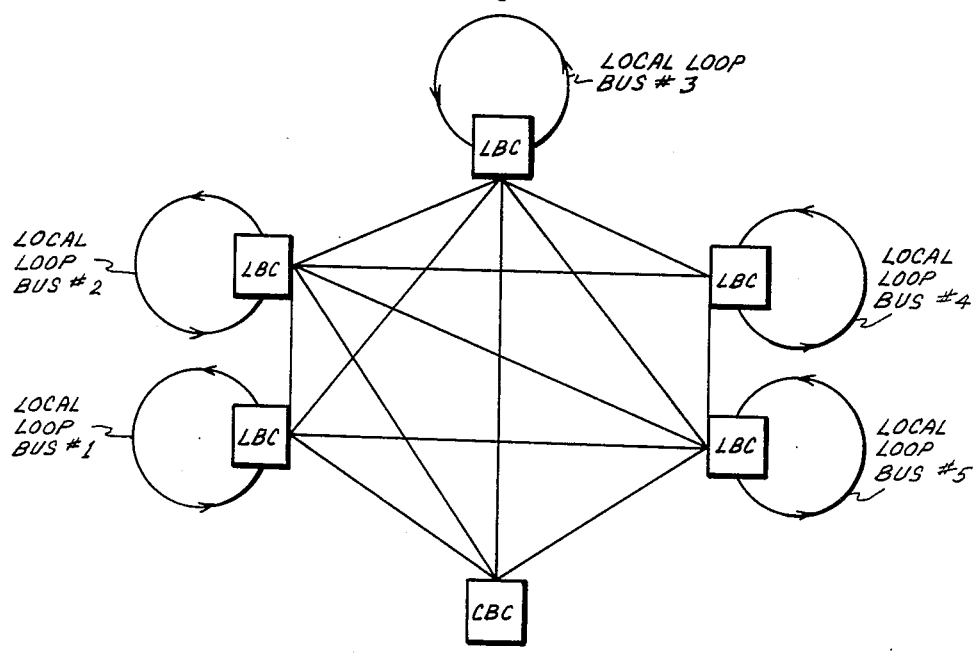
FIG. 9 is a block diagram illustrating a plurality of the distribution systems of FIG. 3 in a fully connected network.

Higer user data rates than are allowed by the tandem network of FIG. 8 can be accommodated by means of a fully connected network as illustrated in FIG. 9. The fully connected network also has the additional advantage that a complete failure of any local distribution loop only results in loss of data to and from that loop rather than a complete network collapse. A fully connected network allows a user within a local distribution loop to specify which local distribution loop and which time slot in that loop he desires to communicate with. Since the only limitation in data rate is the local distribution rate, users can be served up to a $1/(2N_L t_d)$ sampling rate. Transmission formats must be adjusted so that the loop and the time slot in the loop is defined by each user. The simplest means of doing this is to have each user transmit in the time slot of the intended recipient only. Instead of transmitting just the data bit, the user transmits the address of the loop it desires to communicate with. A serial to parallel conversion is then implemented on the transmitted data stream and the data appears as pulses on the appropriate line to the intended local loop. The system is timed so that the data bit arrives within an interval where it can be distributed to the intended user. If there are L loops in the system, the transmission rate must be at least log a $L/(2N_L t_d)$ in order to accommodate single user non-blocking service to all intended recipients. If conferencing is provided, this transmission rate must be increased by the number of individuals it is desired to accommodate in a conference call. Activity information in such a system must be handled in a more complex manner where the local bus controller would distribute permission to transmit to other loops in a time slot based on information received from the central bus controller. The simple parallel marking procedure of the tandem network of FIG. 8 is lost.

While I have described above the principles of my invention in connection with specific apparatus it is to be clearly understood that this description is made only by way of example and not as a limitation to the scope of my invention as set forth in the objects thereof and in the accompanying claims.

I claim:

1. A multiuser protected optical data bus distribution system comprising:
   an optical fiber capable of propagating thereon two different signals independent of each other, said fiber being coupled in a loop to a control station and N equally spaced users, where N is equal to an integer greater than one, and propagating data between said N users in time sequence in one direction around said loop; and
   first means disposed in said control station to transmit a first masking signal on said fiber in a direction around said loop opposite to said given direction to prevent interception of said data, said first masking signal being turned off at a given time for a predetermined period of time to provide a window in said first masking signal which arrives at each of said N users in time sequence coincident with said data intended for each of said N users to enable each of said N users to recover said data intended therefore.

2. A system according to claim 1, wherein said first masking signal is noise.

3. A system according to claim 1, wherein said data is propagated in amplitude modulated pulse form.

4. A system according to claim 1, wherein said data is propagated in digital form.

5. A system according to claim 1, wherein each of said N users include
   an acoustic means to remove said data intended therefore from said fiber during the presence of said window.

6. A system according to claim 1, wherein each of said N users are assigned two different adjacent time slots in a time frame composed of a time sequential arrangement of all of said two adjacent time slots, one time slot of each of said two adjacent time slots being assigned for transmission from an associated one of said N users and the other time slot of each of said two adjacent time slots being assigned for reception at said associated one of said N users, and further including second means disposed in said control station to transmit a second masking signal on said fiber in said given direction to prevent interception of said data in said one time slot of each of said two adjacent time slots, said second masking signal including pulses time coincident with each of said one time slot of each of said two adjacent time slots.

7. A system according to claim 6, wherein said pulses of said second masking signal are bursts of noise.

8. A system according to claim 7, wherein said first masking signal is noise.

9. A system according to claim 1, wherein said fiber includes
- a central core, and
- an outer core coaxial of said central core, said data is propagated on said central core, and said first masking signal is propagated on said outer core.

10. A system according to claim 9, wherein said first masking signal is noise.

11. A system according to claim 9, wherein said data is propagated in amplitude modulated pulse form.

12. A system according to claim 9, wherein said data is propagated in digital form.

13. A system according to claim 9, wherein each of said N users include
- an acoustic means to remove said data intended therefore from said fiber during the presence of said window.

14. A system according to claim 9, wherein each of said N users are assigned two different adjacent time slots in a time frame composed of a time sequential arrangement of all of said two adjacent time slots, one time slot of each of said two adjacent time slots being assigned for transmission from an associated one of said N users and the other time slot of each of said two adjacent time slots being assigned for reception at said associated one of said N users, and further including second means disposed in said control station to transmit a second masking signal on said central core in said given direction to prevent interception of said data in said one time slot of each of said two adjacent time slots, said second masking signal including pulses time coincident with each of said one time slot of each of said two adjacent time slots.

15. A system according to claim 14, wherein said pulses of said second masking signal are bursts of noise.

16. A system according to claim 15, wherein said first masking signal is noise.

* * * * *